US007167632B2

(12) United States Patent
Cosmao et al.

(10) Patent No.: US 7,167,632 B2
(45) Date of Patent: Jan. 23, 2007

(54) PROCESS FOR DISPLAYING BROADCAST AND RECORDED TRANSMISSIONS POSSESSING A COMMON CHARACTERISTIC AND ASSOCIATED RECEIVER

(75) Inventors: Michel Cosmao, Liffré (FR); Louis Chevallier, La Mézière (FR); Pierre Houeix, Cesson-Sévigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 1411 days.

(21) Appl. No.: 09/808,327

(22) Filed: Mar. 14, 2001

(65) Prior Publication Data

US 2001/0023498 A1    Sep. 20, 2001

(30) Foreign Application Priority Data

Mar. 15, 2000   (FR) ................................ 00 03311

(51) Int. Cl.
*H04N 5/91*   (2006.01)
(52) U.S. Cl. .......................... 386/46; 386/52; 725/136
(58) Field of Classification Search .................... 386/1, 386/46, 45, 52, 125, 126; 725/34, 35, 42, 725/131, 132, 134, 139, 140, 142, 151, 152, 725/136; 348/460, 565
See application file for complete search history.

(56) References Cited

U.S. PATENT DOCUMENTS 5,668,917 A * 9/1997 Lewine ........................ 386/52

6,100,941 A * 8/2000 Dimitrova et al. .......... 348/460
6,163,316 A * 12/2000 Killian ........................ 348/565
6,698,020 B1 * 2/2004 Zigmond et al. ............. 725/34

FOREIGN PATENT DOCUMENTS

FR          2633132       12/1989
WO          WO99/22513    5/1999

OTHER PUBLICATIONS

French Search Report (translation enclosed) citing the above-listed references: AA, AM and AN.

* cited by examiner

*Primary Examiner*—James J. Groody
*Assistant Examiner*—Christopher Onuaku
(74) *Attorney, Agent, or Firm*—Joseph J. Laks; Robert D. Shedd

(57) ABSTRACT

A broadcast network sends audiovisual transmissions to a plurality of receivers. The transmissions contain also short audiovisual transmissions, typically advertising spots and information for triggering the displaying of an advertisement page. The receivers are furnished with a large recording capacity that allows the recording of several short audiovisual transmissions. At a time defined by the information transmitted in the audiovisual transmissions, the short audiovisual transmissions are, upon reception in the receiver, automatically replaced by transmissions of the same type previously recorded in the receiver. The receiver resumes normal displaying of the transmissions at the end of the broadcasting of the audiovisual transmissions of a certain type. According to an improvement, the recording of the transmissions can be performed according to the preferences of the user. The preferences of the user are defined during a configuration phase.

14 Claims, 6 Drawing Sheets

Array of profiles

| | Identifier - IDENT | Start and end address of the recordings area | Write pointer | Read pointer | List of preferences - PROFILE |
|---|---|---|---|---|---|
| i = 1 | 2 | TAB_DEB2 / TAB_FIN2 | PT_Wr2 | PT_Rd2 | [Sport, cars, offers of service, songs] |
| i = 2 | 1 | TAB_DEB1 / TAB_FIN1 | PT_Wr1 | PT_Rd1 | [Beauty, maintenance products, domestic electrical] |
| i = 3 | 3 | TAB_DEB3 / TAB_FIN3 | PT_Wr3 | PT_Rd3 | [Toys, songs] |

Array of recordings corresponding to profile number 2

| Serial number of the recording | Address of the recording | Duration of the recording | Topic of the recording |
|---|---|---|---|
| 1 | REC2.1 | 1'30" | Sport |
| 2 | REC2.2 | 1'10" | Cars |
| 3 | REC2.3 | 0'31" | Songs |
| 4 | REC2.4 | 0'35" | Offers of service | ←PT_Rd2
| 5 | REC2.5 | 0'33" | Sport |

TAB_DEB 2  J=1
J=2
J=3 — PT_Wr2→
J=4
J=5

TAB_FIN2

Array of recordings corresponding to profile number 1

| Serial number of the recording | Address of the recording | Duration of the recording | Topic of the recording |
|---|---|---|---|
| 1 | REC2.1 | 1'30" | Beauty |
| 2 | REC2.2 | 0'45" | Maintenance products |
| 3 | REC2.3 | 0'31" | Beauty | ←PT_Rd1

TAB_DEB 1  J=1
J=2
J=3· PT_Wr1→

TAB_FIN1

Array of recordings corresponding to profile number 3

| Serial number of the recording | Address of the recording | Duration of the recording | Topic of the recording |
|---|---|---|---|
| 1 | REC2.1 | 1'30" | Songs |
| 2 | REC2.2 | 0'45" | Toys |
| 3 | REC2.3 | 0'31" | Toys | ←PT_Rd3

TAB_DEB 3  J=1
J=2 · PT_Wr3→
J=3

TAB_FIN3

Figure 3

PROCESS FOR DISPLAYING BROADCAST AND RECORDED TRANSMISSIONS POSSESSING A COMMON CHARACTERISTIC AND ASSOCIATED RECEIVER

FIELD OF THE INVENTION

The invention relates to a process for displaying audiovisual transmissions broadcast by a center and a receiver of audiovisual transmissions.

The invention applies more particularly to digital television receivers/decoders, more simply referred to as "decoders" hereinbelow. Nowadays, these appliances are furnished with a hard disk capable of recording several hours of audiovisual content.

BACKGROUND

The network broadcasts audiovisual transmissions more commonly referred to as "events" and data intended for referencing them. A service is a series of events broadcast in a specified stream. The reference data are for example defined in the DVB-SI specifications ("Digital Video Broadcast—specification for Service Information") EN 300 468 V1.3.1 (published by the ETSI). They take the form of tables and of descriptors which describe the objects transmitted on the broadcasting network. The tables contain references related to the events broadcast such as: the title, the times of broadcast, the broadcasting channel, a brief summary, etc. Typically, the streams in accordance with the DVB-SI standard contain the following tables: NIT, SDT, EIT and possibly BAT. The NIT table defines the general structure of the network and indicates the list of transport streams and services broadcast. The SDT table gives additional information relating to the services, for example the unencrypted name of a service. The EIT table indicates a list of events for each service. It makes it possible in particular to indicate the event currently being broadcast. For its part, the BAT table clusters together several services into a bouquet of services which can be output by several broadcasting networks. The standard also specifies so-called proprietor fields, which the broadcasters can use for a specific use, to add non-standardized supplementary information to that already specified.

Among other things, the transmitter broadcasts advertising sequences. The topics of these sequences vary greatly, for example: sport, cars, maintenance products, domestic electrical, songs, etc. An advertising interlude comprises one or more advertising sequences which are not generally of the same topic. The user is ordinarily interested in a few topics but not all. He can enter into his decoder a profile defined by a number of preferred topics. The decoder possesses a filter which authorizes the displaying of the events whose topic corresponds to the profile of the user. However, if the advertising sequence is filtered, the television screen is black, this being unpleasant for the user.

The invention aims to provide the user, at the moment scheduled by the transmitter, with advertising sequences which possess a certain characteristic.

SUMMARY OF THE INVENTION

The subject of the invention is a process for displaying audiovisual transmissions in a digital television receiver, the said transmissions being broadcast from a broadcasting center, the receiver being furnished with a means for displaying the transmissions, wherein it comprises:

a step of receiving audiovisual transmissions and at least one service information item, which are broadcast by the broadcasting center, a first step of displaying an audiovisual transmission received, a step of reading an audiovisual transmission recorded, a second step of displaying the said audiovisual transmission read while replacing at least part of the said audiovisual transmission received, the second step being triggered at a moment defined by the service information item.

Thus, the decoder replaces broadcast advertising sequences with advertising sequences recorded in the decoder.

According to a first improvement, the transmissions recorded originate from the broadcasting network. According to another improvement, the transmissions originating from the network are recorded if they correspond to criteria defined by data stored in the decoder. According to another improvement, the recorded transmissions correspond to the profile selected by the user. Thus, the television displays transmissions according to the preferences of the user.

According to an improvement, the user enters the list of his preferences beforehand. This list enables the decoder to automatically select the advertising sequences which correspond to his preferences and which must be recorded. The memory of the receiver can contain several lists of preferences, each list being selectable with the aid of a profile identifier. According to another improvement, in the course of the end of the displaying of a recording, the decoder records the resumption of the non-advertising events.

According to another improvement, the decoder does not immediately display the transmissions broadcast when the advertising interlude has terminated, it continues displaying the recording until the end of the latter, whilst recording the start of the event broadcast following the advertising interlude. The recording performed in a temporary storage memory avoids the user having to miss a part of a transmission of the first type.

The subject of the invention is also a receiver of digital audiovisual transmissions comprising a means of receiving transmissions transmitted from a broadcasting center, a memory containing at least one audiovisual transmission and a means of displaying the transmissions, wherein the transmissions broadcast by the center are of two types, the type of the transmissions being identified by a characteristic contained in a service information item transmitted by the broadcasting center, and in that the decoder furthermore comprises a first means of detecting the change of type of the transmissions received by the reception means, a means of selecting the transmissions so as to display either transmissions of a first type currently being broadcast or transmissions recorded in the memory, the selecting means is controlled by the detecting means in such a way that the broadcasting of a transmission of a second type causes the displaying of a recorded transmission.

BRIEF DESCRIPTION OF THE DRAWINGS

Other characteristics and advantages of the present invention will emerge from the description of the exemplary embodiments which will follow, taken by way of non-limiting examples, with reference to the appended figures, in which:

FIG. 3 represents an example of the content of the memory according to the invention;

DETAILED DESCRIPTION

Figure 1:
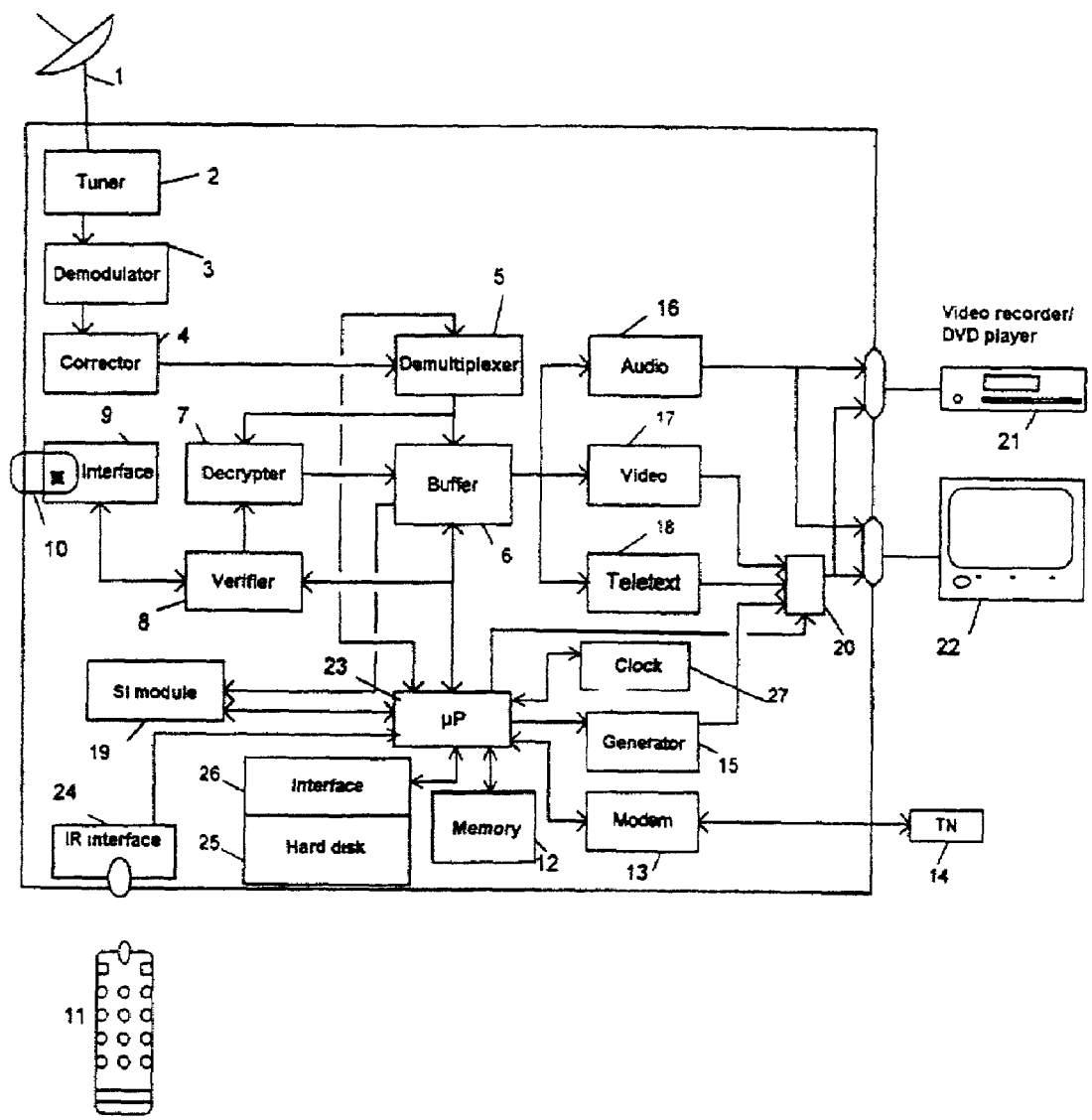
FIG. 1 represents a decoder for implementing the invention.

A receiver according to the invention is described in FIG. 1. The receiver is, for example, a decoder in accordance with the DVB specifications. It uses an ISO/IEC 13818-1 transport layer.

The receiver is linked to an antenna 1, itself linked to a tuner of the decoder. The signal provided by the tuner is demodulated by a demodulator 3. The demodulated data are deinterlaced and corrected by an error correcting circuit 4 and sent to a demultiplexer 5. The latter comprises a certain number of filters programmed by a microprocessor 23 as a function of the various applications supported by the receiver. The microprocessor 23 is connected to a memory 12 comprising the operating system as well as the resident or downloaded programs for implementing applications such as an EPG. The memory is illustrated in the form of a single block, but physically may comprise several blocks of different kinds; random access memory RAM, read only memory ROM, reprogrammable memory EEPROM or FLASH. The read only memory ROM contains among other things the basic program of the decoder. This program comprises input/output management routines such as: programming of the demultiplexer, receiving of orders transmitted by the remote control, displaying of video sequences recorded in memory and specified by a pointer, etc.

A character generator 15 allows the generation of control or graphics menus relating to the parameters of the receiver or to a particular application. The video signal generated is multiplexed with one of the video signals originating from the video decoder 17 to a SCART socket linked to a television 22. The multiplexing circuit 20 is managed by the microprocessor 23. The receiver is also equipped with a remote control 1, linked to the microprocessor by an infrared link 24. For the clarity of the diagram, only the most important connections of the microprocessor 23 are illustrated.

The audio or video sections or packets filtered by the demultiplexer are stored in predefined areas of a buffer memory 6. The receiver also comprises a hard disk 25 linked to the microprocessor with the aid of an interface 26 allowing fast transfers of information. The hard disk is advantageously integrated with the decoder, it can be proposed in the form of a separate piece of equipment. The support of the disk may possibly be removable. The program executable by the microprocessor 23 analyses the data stored in the buffer memory 6 by the demultiplexer 5 and determines whether they correspond to the profile selected by the user. If so, they are then recorded in the hard disk 25. The capacity of the disk makes it possible to record at least several hours of audiovisual transmissions in a compressed format (MPEG 2 for example). A part of the hard disk is allotted for recording the advertising sequences. This part referred to as "MEM_ENR" is divided into as many areas "MEM_ENRi" as there are profiles "i". The program also analyses the proprietor field contained in the proprietor descriptor of the DVB SI tables of each transmission received, so as to determine whether the latter is or is not an advertising sequence. The term "advertising sequence" should be regarded as an example. Any sufficiently short event whose topic is determinable by the decoder can be used for the present invention.

When an advertising sequence is detected, the program extracts recorded advertising sequences from the hard disk 25 and dispatches them to the television screen 22. Otherwise, the transmission not being of the type of an advertising sequence, it is dispatched to the audio/video decoders 16 and 17 so as to be displayed. The program is also responsible for detecting the end of the reading of an advertising recording. When the decoder no longer receives advertising sequences and at the end of the reading of a recording, the program dispatches nonadvertising transmissions to the television screen.

Figure 2:
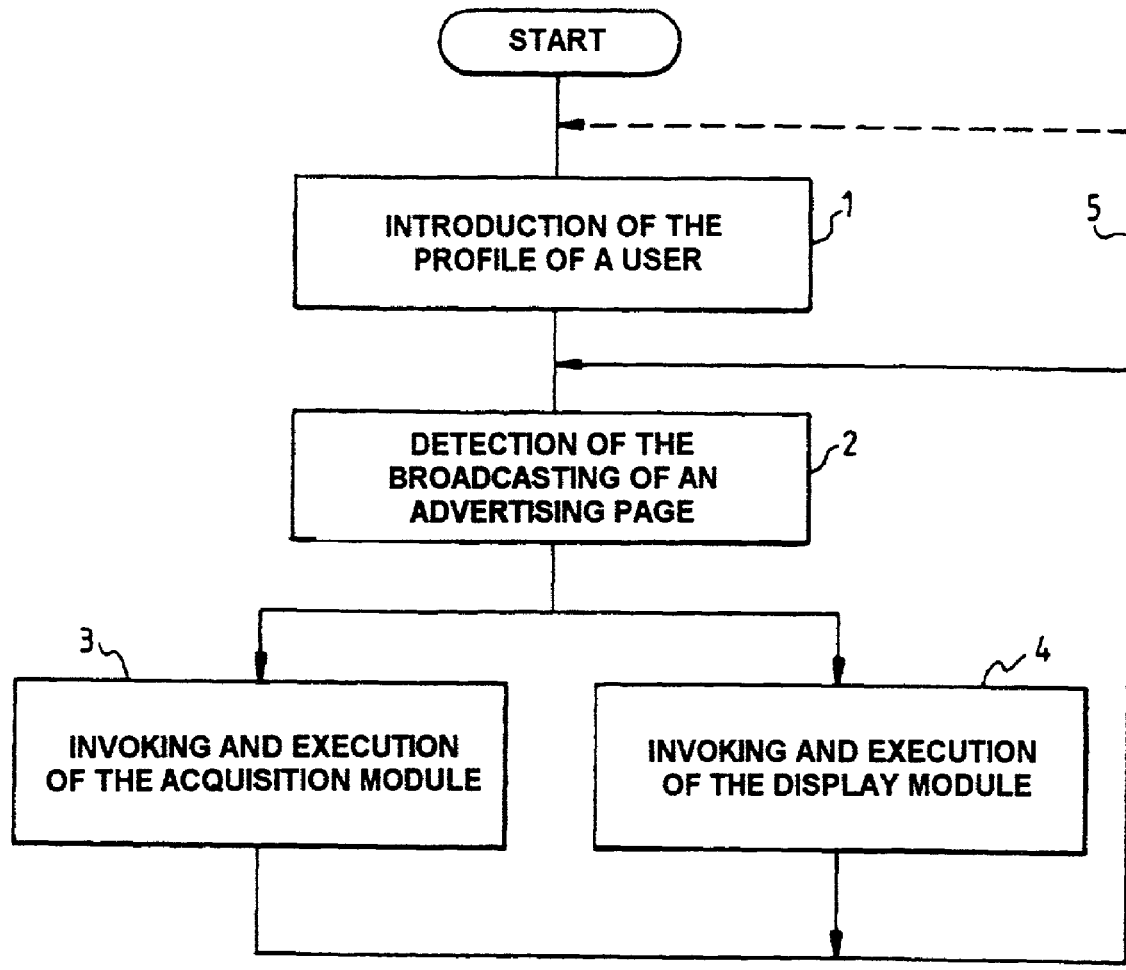
FIG. 2 represents a flowchart of the various steps of the process according to the invention.

FIG. 2 shows the organization of the various steps for implementing the invention. First (step 1), the user invokes a configuration module for formulating a profile, that is to say a list of preferred topics. In step 2, the decoder detects the broadcasting of an identifier contained in a proprietor descriptor publicizing the next receipt of an advertising interlude. Detection triggers the execution of two program modules which run two steps: an acquisition module responsible for recording certain broadcast advertising sequences and a display module responsible for displaying the advertising recordings which the first has recorded previously.

At the start of its execution, the configuration module asks the user to enter a profile identifier "IDENT" in the form of a digit from 0 to 9. This value may be identical to the identifier of the user, but several profiles may also be associated with one and the same user. For example, the user does not necessarily have the same preferences in the evening as in the morning. Advantageously, a list of available topics is presented to the user in the form of a menu by the configuration module. These topics take the form of displayed character strings, for example "sport", "cars", "songs", "maintenance products", etc. With the aid of the buttons on his remote control, the user selects the topics according to his preferences.

According to a first embodiment, the updating of the list of topics available is performed by downloading broadcast data of a special service. According to a first variant, the advertising sequences broadcast possess a proprietor field in a proprietor descriptor specifying the topic with the aid of one or more character strings. The decoder formulates the list of topics as and when advertising sequences are received, the new topics being appended to the list. According to a second variant, the complete list is broadcast in a data block furnished with a specific identifier written in a proprietor descriptor, the availability of such a list then being almost immediate, the updating being performed easily. In the three cases, the topics may be coded in the proprietor field (for example: "ID123", "ID956", "ID742"). The decoder possesses a table of correspondence between the code and the character string: ID123="sport", ID956="cars", ID742="songs".

The method of selecting the topics constituting a profile can also be performed automatically. To do this, the decoder analyses the behavior of the user and determines his profile on the basis of his choices of programs.

FIG. 3 is a diagram representing a part of the nonvolatile memory according to the invention. Among other things it comprises the "TAB_PRO" array which presents general data corresponding to each profile and "TAB_ENRi" arrays which contain the descriptors of all the advertising recordings.

The TAB_PRO array possesses the following fields:
identifier of the user and of his profile (IDENT),
pointers of the TAB_ENRi array: "ADR_DEBi" and "ADR_FINi",
value of the read pointer "PT_Rdi" and write pointer "PT_Wri" of the TAB_ENRi array,
list of profile "i" topics selected by the user.

The configuration module initializes the data of TAB_PRO. The user chooses an identifier of profile "i" and associates a list of preferred topics therewith. ADR_DEBi points to the first address of the array of the recordings of user i: "TAB_ENRi". At the outset, there is no recording, the start address ADR_DEBi and end address ADR_FINi of this array are equal. The module initializes PT_Wri so as to point to the first available descriptor of the array of recordings, that is to say ADR_DEBi. PT_Rdi takes the value "0000" indicating that no recording has been performed for this user. The reading and updating of the arrays TAB_ENRi is performed in a circular manner: the values of PT_Rdi and of PT_Wri increase from ADR_DEBi and ADR_FINi, then take the value ADR_DEBi again when they exceed ADR_FINi.

The descriptors in the arrays TAB_ENRi comprise the following fields:
serial number of recording "j",
address "PT_RECi.j" of recording j in MEM_ENRi,
duration of recording j,
topic(s) of recording j.

Subsequently, each recording is identified by the pair of references (i.j). The configuration module initializes the first value of pointer RECi.1 to an available area MEM_ENRi. The size of the area MEM_ENRi depends on the total duration of recording and of display of the sequences for each profile. The configuration module can fix this duration at 30 minutes for example. In a particular simple manner, the recordings are consecutive in the hard disk. The values of the pointers RECi,j following one another, while the maximum duration has not been attained, it is possible for the last sequence received to be appended in MEM_ENRi. Next, the last sequence received is written by overwriting the oldest.

The data packets corresponding to an advertising sequence received by the demultiplexer are sent to the acquisition module which analyses individually the topic of each sequence. If this topic corresponds to the profile selected by the user, the sequence must be recorded in the hard disk.

Figure 4:
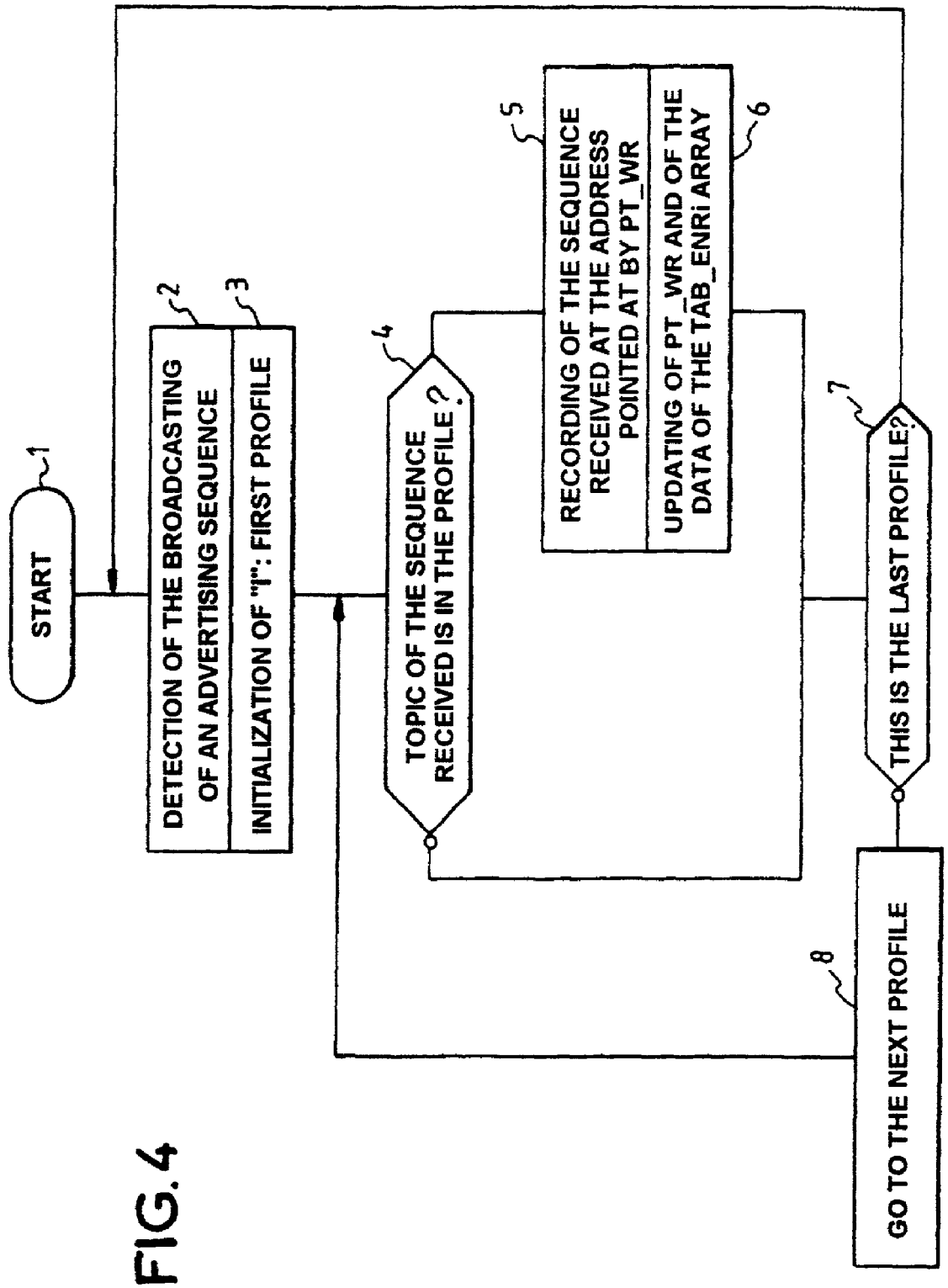
FIG. 4 represents a flowchart of the acquisition module.

FIG. 4 presents the execution flowchart for the acquisition module. In step 1, the demultiplexer is programmed so as to detect the data packets and the microprocessor determines whether they correspond to advertising sequences. As a variant, the center can transmit a signal publicizing the broadcasting of an advertising interlude at a certain moment and of a certain duration. In this case, there is no need to indicate for each sequence the advertising nature thereof. In step 2, an interlude is detected, the first advertising sequence is stored in a work memory of the decoder. In step 3, the module initializes a counter "I" making it possible to scan all the profiles stored, beginning with the first of the array TAB_PRO (i=1). In step 4, the module tests whether the topic or topics of the sequence received is/are included in the list of topics of the $I^{th}$ profile currently being analyzed. The test consists in searching through the list of preferences of TAB_PRO for the character string written in the "TOPIC" descriptor of the sequence received. If it is found there, the sequence corresponds to the profile. There may be several topics for one and the same sequence, for example: maintenance products for cars. It is then necessary to perform as many tests as there are topics.

If the topic does not correspond to profile "i", the sequence is ignored and the module goes directly to step 7. Otherwise, the sequence stored in work memory is recorded at the address specified by the pointer PT_Wri (step 5). Then in step 6, the pointer PT_Wri is updated with the address for writing the next recording. The management of the pointers being circular, PT_Wri is initialized to the value "TAB_DEBi" of the start of the TAB_ENRi array, when the total duration of recording is reached. The acquisition module also writes the duration and topic of the advertising recording in the array. In step 7, the module tests whether this is the last profile of the TAB_PRO array and if so, in step 8 1 is added to the counter "I" so as to point at the next profile in the TAB_PRO array. If the last profile has just been processed, the module loops back to step 2 for detecting a new advertising sequence. If several profile lists possess the same topic (in the example of FIG. 3: "songs"), the sequences possessing this topic are recorded as many times as this topic is present in a list.

After having shown the manner of operation of the acquisition module, that of the display module will now be explained. The display module is invoked each time the demultiplexer receives an advertising interlude. This interlude is broadcast at a precise moment of an event or between two events. The module initiates a task for displaying on the screen the recording pointed at by the pointer "PT_Rdi". The advertising sequence broadcast is dealt with by the acquisition module. One of the essential aims of the invention is thus seen to be achieved: the decoder replaces on the screen a group of broadcast sequences with a group consisting of recorded sequences corresponding to the profile selected by the user.

In almost all cases, the end of a broadcast advertising interlude does not occur exactly at the end of the displaying of an advertising recording. The decoder allows the displaying of the recording to terminate. In this case, the advertising interlude displayed lasts a longer time than the interlude broadcast. So as not to miss the start of the event broadcast in the course of the end of the displaying of the advertising recording, the decoder records the event in a temporary storage memory either in the hard disk 25, or in a work memory. At the end of the displaying of the advertising recording, the decoder initiates a task for displaying the content of the temporary storage memory. The temporary storage memory is managed as a queue (or FIFO—"First In First Out"). The displaying of the event is henceforth shifted in time by a certain duration $\Delta t$, this function being referred to as "Time Shifting". During a next broadcasting of an advertising interlude, this shift may be compensated for by reducing the duration of display of the recorded advertising interlude.

Figure 5:
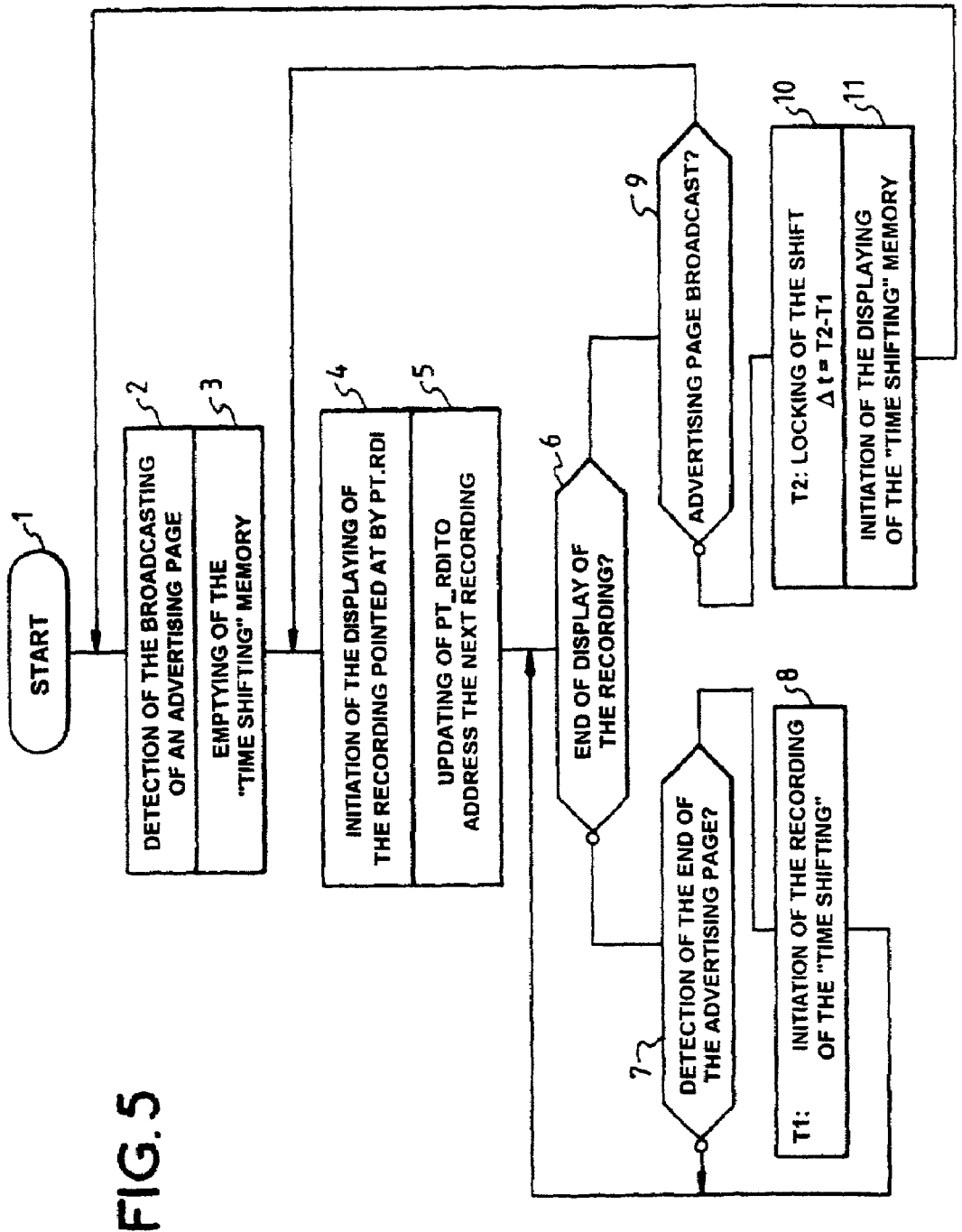
FIG. 5 represents a flowchart of the display module.

The flowchart of FIG. 5 shows the manner of operation of the display module. In step 1, the demultiplexer is programmed to detect the start of the broadcasting of an advertising interlude. In step 2, an advertising interlude is detected. In step 3, the decoder waits until the temporary storage memory is empty to display a new advertising interlude at the instant of the event desired by the broadcaster. At this moment, the module searches for the recording pointed at by PT_Rdi (step 4) and initiates its display. In step 5, PT_Rdi is updated so as to point at the next recording to be displayed. It was stated earlier that the read pointer moves in a circular fashion, pointing successively at each recording. In the example, the memory MEM_ENR2 corresponding to profile number 2 possesses five elements numbered from 1 to 5. When the fifth has been read, the module initializes the pointer so as to address the first element.

In step 6, the module tests whether the displaying of the recording has terminated. If "no" (step 7), the module tests whether the advertising interlude broadcast has just terminated. If it has not, the program loops back continuously to steps 6 and 7. If the interlude broadcast has just terminated (instant T1), the module initiates the recording of the event broadcast in the memory of the "time shifting", then loops back to steps 6 and 7. Step 8 is executed only once during a broadcast of an advertising interlude.

If the displaying of the recording has terminated, the module tests whether the advertising interlude is still broadcast (step 9). As long as this interlude is broadcast, the module loops back to step 4 and initiates the displaying of a new recording each time. Otherwise (moment T2—step 10) the event is broadcast again and since the advertising recording has just terminated, the displaying of the event can be resumed. The time shift is equal to the difference between T2 and T1 ($\Delta t = T2-T1$). The module initiates the displaying of the video sequence in the temporary storage memory of the "time shifting" and then loops back to step 2, waiting for a new broadcast of an advertising interlude.

It was stated earlier that in a preferred embodiment, the old recordings were overwritten in memory by the recent broadcasts. In this mode, there is no synchronization between the display module and recording module. A variant consists in momentarily stopping recording as soon as the memory is full of undisplayed recordings and in erasing the recording as soon as it is displayed. Erasure brings about a freeing of the memory, this permitting the recording of new sequences. This variant favors the display of old sequences.

Figure 6:
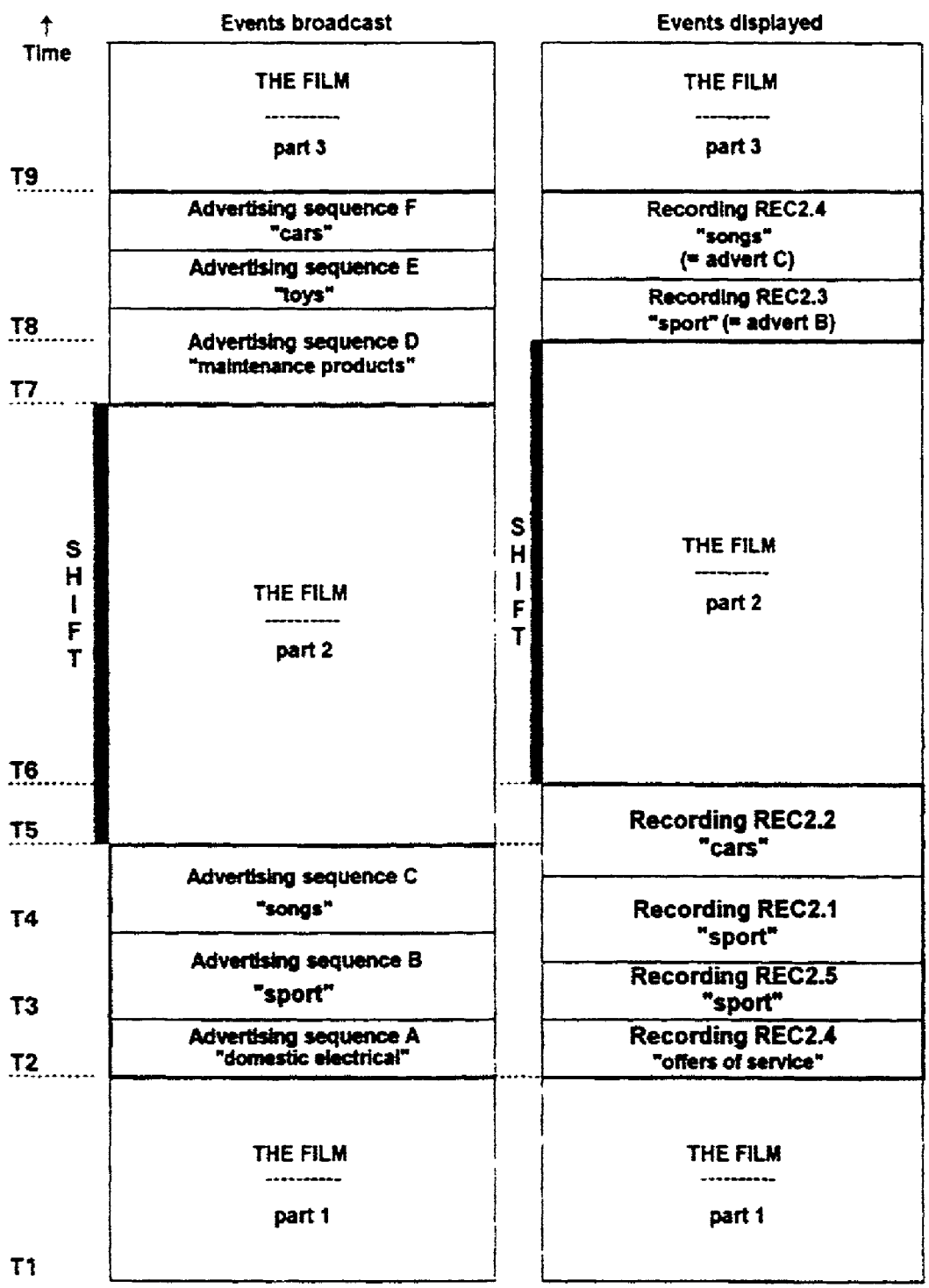
FIG. 6 shows an example of temporal representation of the broadcasting and of the displaying of the events and of the recordings.

FIG. 6 shows the evolution over time of the sequences broadcast and of the recordings displayed. A film called "The film" is split into three parts separated by two advertising interludes. The user has selected profile 2, the memory of the recordings of this profile is at the outset such as shown in FIG. 3. The topics of profile 2 are: "sport, cars, offers of service, songs".

At the instant T1, the decoder displays on the screen of the television the event "The FILM" without any time shift. At the instant T2, an advertising interlude comprising three sequences is broadcast. The decoder searches through the TAB_ENR2 array for the recording pointed at by PT_Rd2, that is to say the recording of 1'02" at the address REC2.4 having as topic: "offers of service", and commences the display. At the end thereof, the advertising interlude is still being broadcast, the decoder displays the next recording read at the address REC 2.5 (j=5). At the instant T3, the advertising sequence B is broadcast, its topic: "sport" corresponds to profile 2, it is therefore recorded in the hard disk. The descriptor of this recording is pointed at by PT_Wr, it occupies the position j=3. The address, the duration and the topic of the recording of the sequence B are updated in this descriptor. PT_Wr2 is then updated and points at the next descriptor (j=4). At the instant T4, the advertising sequence C is broadcast. Its topic: "songs" corresponds like the sequence B to profile 2, it is therefore recorded in the hard disk. Its parameters are written in the descriptor j=4. PT_Wr2 is then updated and points at the next descriptor (j=5).

At the instant T5, the advertising interlude has terminated. At this moment, the recording REC2.2 (j=5) is being displayed, it terminates at the instant T6. The decoder records in the temporary storage memory of the "time shifting", the event portion broadcast between T5 to T6. From T6, the decoder displays the event "THE FILM" read from the start of the temporary storage memory. From this moment onwards, there is a time shift of ($\Delta = T6-T5$) between the broadcasting of part 2 of the film and the displaying of this same part. This shift ($\Delta$) is depicted in FIG. 6 by the grey vertical bands shifted with respect to one another along the time axis.

At the instant T7, the second advertising interlude is broadcast, the decoder no longer records in the temporary storage memory. At the instant T8 which is equal to [T7+ (T6−T5)], all of part 2 of the film has been displayed, the temporary storage memory is empty. The decoder then searches through the TAB_ENR2 array for the recording pointed at by PT_Rd2, that is to say the recording (j=3) having as topic: "sport". The latter is in fact the advert B broadcast during the first advertising interlude. By chance, at the instant T9 the advertising interlude broadcast terminates at the same time as the displaying of a recording, part 3 of the film can then be displayed with no shift, up to the end of the film. In this case and until the next broadcast of an advertising interlude, there is no longer any need to use the "time shifting" function.

In a simple manner, the advertising sequences are always replaced at the display level by recordings. However, if it is possible to detect the topic right from the start of the sequence, and if it corresponds to the profile, then it is possible to display it directly and at the same time record it. This improvement is used especially when the profile contains many topics and in particular if the user, by selecting all the topics, does not wish to exercise any filtering and wishes to display all the sequences broadcast. This improvement has the advantage of always giving the user "brand new" sequences.

The sequences corresponding to the profile are always recorded. In a first embodiment, the recorded sequences are extracted and selected on the basis of advertising interludes broadcast. But, over a fairly long period, the aggregate duration of the broadcast advertising interludes is almost equal to the aggregate duration of the displayed interludes. FIG. 6 shows that the aggregate duration of the sequences A, B, D, D, E and F is equal to that of the recordings REC2.4, REC2.5, REC2.1, REC2.2, REC2.3 and REC2.4. Individually, the displayed and broadcast interludes do not have the same duration, but over a long period the discrepancies compensate for one another. Excluding the extremely rare case where the advertising sequences always correspond to the selected profile, since it is necessary to exclude a certain number of sequences which do not correspond to the profile, the same sequences have to be displayed several times to arrive at the same display time. If the memory contains few recordings, they will be displayed often. It is therefore important for the decoder to rapidly build up a stock of sequences which it will then be possible, when the broadcaster requests the displaying of an advertising interlude, to display.

A variant consists in the user firstly entering a profile on the basis of a virgin decoder, and the decoder then recording a part of the recording memory corresponding to this profile (half for example, that is to say 15 minutes of display), and subsequently the decoder invoking the module for displaying the recorded sequences. This enables the decoder to build up a fairly large stock of sequences so that they can be adequately renewed at the moment of the displaying of the advertising interludes.

A second variant consists in the sequences being broadcast on a so-called "advertising" specific service. The advertising sequences are thus transmitted on a different communication channel to that of the non-advertising events. The acquisition module then programs the demultiplexer to extract the advertising sequences from this communication channel. If only one demultiplexer is available to the decoder, this operation is performed in standby mode, the remainder of the time the decoder displays the service selected by the user. This acquisition can occur at any moment if two demultiplexers are available to the decoder, one being used to extract the service selected by the user and the other to extract sequences from the advertising service.

According to a variant, the event containing advertising interludes is firstly recorded in the hard disk and then displayed when requested by the user. In the same way as for a broadcast event, the acquisition and display modules detect the presence of the advertising sequences, and as earlier, record the sequences corresponding to the profiles and display the recordings. A difference is the absence of "time shifting". Specifically, the event being recorded, it is easy to halt the running thereof, and to have it distributed once the displaying of the recordings is at an end.

The invention is of course not limited to the embodiments just described. In particular, the technology of the memory of the recordings can be optical (recordable DVD-ROM, CD-ROM for example), magnetic (cartridge), or some equivalent technology. Neither is the invention limited to advertising sequences, any events whose descriptor contains an identifier specifying that the duration is short and whose topic is determinable by the decoder, can be used by the present invention.

The invention claimed is:

1. Process for displaying audiovisual transmissions in a digital television receiver, including first transmissions being broadcast from a broadcasting center and displayed by a receiver, wherein said process comprises:
   a step of receiving at least a first audiovisual transmission and at least one service information item defining a temporal interlude within the first transmission, which are broadcast by the broadcasting center,
   a first step of displaying the first audiovisual transmission until a moment defined by a beginning of the interlude,
   a step of reading a second recorded audiovisual transmission,
   a second step of displaying the second read audiovisual transmission triggered at a moment defined by the beginning of the interlude,
   a step of recording in a memory of the receiver the first transmission at a moment defined by an end of the interlude,
   a third step of displaying the recorded first transmission triggered further to the second step of displaying of the second transmission, the displaying and the receiving of the first transmission being shifted by a certain time.

2. Process for displaying audiovisual transmissions according to claim 1, further comprising a step of recording in a nonvolatile storage means at least one second transmission broadcast prior to the second displaying step, said second transmission possessing a characteristic in common with the transmission or transmission part replaced in the second displaying step.

3. Process for displaying audiovisual transmissions according to claim 2, wherein the recording of the second transmissions is conditioned by the result of a comparison between a criterion written in the memory of the receiver and a data item broadcast in a service information item characterizing the transmission to be recorded.

4. Process for displaying audiovisual transmissions according to claim 3, wherein the recorded second transmissions are identified by a topic, the written criterion corresponds to a user profile, and that the condition of recording of the second transmissions is the correspondence between the topic and the written data.

5. Process for displaying audiovisual transmissions according to claim 4, further comprising a prior step of selecting a user profile from among a plurality of specified profiles.

6. Process for displaying audiovisual transmissions according to claim 2, further comprising a prior step of recording a minimum specified quantity of recordable second transmissions, before the execution of the second step of displaying.

7. Process for displaying audiovisual transmissions according to claim 2, wherein new recordings are prohibited as long as none of the current recordings has been read, the reading of a recording giving rise to its erasure from the nonvolatile storage means.

8. Process for displaying audiovisual transmissions according to claim 1, wherein the second transmission is composed of a plurality of recorded sequences, each sequence being fully displayed during the second step of displaying as long as the interlude is not ended.

9. Receiver of digital audiovisual transmissions comprising a means of receiving transmissions transmitted from a broadcasting center, a memory containing at least one audiovisual transmission and a means of displaying the transmissions, wherein
   said means for receiving receives at least a first audiovisual transmission and one service information item defining a temporal interlude within the first transmission,
   said means for displaying displays the first audiovisual transmission until a moment defined by a beginning of the interlude;
   said means for displaying displays a second audiovisual transmission recorded in the memory triggered at a moment defined by the beginning of the interlude,
   said memory records the first transmission at a moment defined by an end of the interlude,
   said means for displaying displays the recorded first transmission triggered further to the displaying of the second transmission, the displaying and the receiving of the first transmission being shifted by a certain time.

10. Receiver of digital audiovisual transmissions according to claim 9, further comprising means for recording in the memory at least one broadcast audiovisual transmission, wherein said recording means comprises a first detecting means authorizing the recording in the memory of a second transmission upon the detection of the broadcasting of the second transmission.

11. Receiver of digital audiovisual transmissions according to claim 10, further comprising means for selecting the second transmissions broadcast according to criteria stored in the receiver, only the selected transmissions are recorded in the memory.

12. Receiver of digital audiovisual transmissions according to claim 11, wherein the memory of the receiver includes profile data entered by at least one user, the second transmission comprises topic identification data for the transmission and a filter comprising a comparator for comparing the profile data and the topic identification of the transmission, the second transmissions being recorded if the topic data item of the transmission corresponds to the profile data.

13. Reciever of audiovisual transmissions according to claim 10, wherein the second transmissions are broadcast on a different communication channel from the first transmissions and the receiver further comprises a second reception means for receiving transmissions from the communication channel broadcasting the second transmissions of the second type.

14. Receiver of audiovisual transmissions according to claim 9, wherein a second transmission is composed of a plurality of recorded sequences, each sequence being fully displayed by the means of displaying as long as the interlude is not ended.

* * * * *